United States Patent [19]
Van Huis

[11] 3,768,444
[45] Oct. 30, 1973

[54] MULTI-DECK CAGE CONSTRUCTION
[75] Inventor: Robert L. Van Huis, Zeeland, Mich.
[73] Assignee: U.S. Industries, Inc., New York, N.Y.
[22] Filed: Apr. 21, 1972
[21] Appl. No.: 246,168

[52] U.S. Cl. .................................................. 119/22
[51] Int. Cl. ............................................ A01k 31/00
[58] Field of Search ..................... 119/22, 18, 48, 17

[56] References Cited
UNITED STATES PATENTS
| | | | |
|---|---|---|---|
| 2,970,567 | 2/1961 | Rubin | 119/22 |
| 2,987,038 | 6/1961 | Cole | 119/18 |

Primary Examiner—Hugh R. Chamblee
Attorney—Peter P. Price et al.

[57] ABSTRACT

A modular poultry cage arrangement includes a pair of spaced support structures having one or more vertically spaced inclined cross supports from which are suspended one or more vertically spaced levels of poultry confinement cages. A dung-collecting tray is mounted on each cross support to collect droppings from the cages thereabove. A scraper mounted on a carriage movable fore and aft along a rail intermittently cleans the trays. A boom pivotally mounted from the carriage supports a scraper blade near its free end for pivotal movement about a horizontal and vertical axis to permit scraping engagement with the tray regardless of the direction of movement of the carriage. Stops limit the degree of pivot to provide a proper scraping angle.

18 Claims, 6 Drawing Figures

MULTI-DECK CAGE CONSTRUCTION

BACKGROUND OF THE INVENTION

This invention relates to a novel construction for assembling a plurality of cages in multiple vertically stacked rows including a novel scraper for disposing of dung collection.

The raising of poultry within confinement cages for egg production purposes is rapidly becoming the predominating system in this country in recent times. This is true because many operating efficiencies are realized as a result of both the automated feeding of the birds and the automated egg-collection techniques permitted by this system. Normally, the floors of the confinement cages are inclined so that eggs laid within the cages will, under the influence of gravity, roll downwardly to the lowermost edge of the cage, normally located at the front thereof. Openings are provided along this edge so that the eggs may pass out of the cages and onto a conveyor belt located directly adjacent such openings. This conveyor takes the eggs directly to a central collection point so that the eggs are thus collected from the cage automatically, with no manual effort involved. Similar automated equipment provides feed and water for the poultry confined within the cages.

With the advant of skyrocketing costs for land and buildings, the concept of a confinement cage structure utilizing more than one layer of cages has become increasingly appealing. Although immediate savings are realized in terms of the amount of building space required, these savings are offset in many cases by the increased complexity in providing apparatus to collect droppings from each level of cages since it is undesirable to have the droppings from one cage enter the cages therebelow. One solution has been to stack the cages in a pyramidal arrangement so that the floor of each cage is suspended directly over the dung-collecting pit. However, although some saving is realized in space, the pyramidal stacking tends to defeat the purpose of vertical stacking since it still requires considerable lateral space.

Thus, there is need in this art for an improved multi-deck cage construction and dung-collecting arrangement which will permit true vertical stacking of as many levels as is desired without offsetting the savings in space by the increased complexity and cost of equipment required to remove droppings collected from each cage.

SUMMARY OF THE INVENTION

In accordance with the present invention, each level of cages includes a pair of oppositely facing longitudinally extending rows of confinement cages. Each row is spaced laterally from the other to provide a drop area in which droppings collected on trays beneath each row of cages can be scraped inwardly into the spacing for collection on a pit beneath the structure. A scraper is movable fore and aft along the trays for scraping droppings collected thereon into the drop area space. The scraper is connected to a carriage mounted on a rail which is driven fore and aft. The scraper blade is pivotal about a horizontal and vertical axis to permit scraping engagement with the tray regardless of the directional movement of the carriage.

In a narrower aspect, the cages are suspended on cross supports forming a "V" laterally across the support frame. This permits a degree of resiliency in the mesh-like cage floors to reduce egg damage as they roll down the incline. In addition, the dung-collecting trays and scraper are mounted on the cross supports above each cage to shield each cage from droppings from the cage above.

The scraper arrangement provided by the invention is simple, positive and structurally sound and reduces wasted movement in that it provides a scraping function in the fore and aft direction. The cross supports and vertical support structures provide a simplified means for suspending a plurallity of levels of cages the number of which is completely arbitrary. In essence, a modular type arrangement is provided in that the number of cages, length of each row and plurality of levels can be selected without altering any significant structural elements. The magnitude of components depends strictly on the design criteria of the poultry house.

DESCRIPTION OF THE PREFERRED EMBODIMENT

Figure 1:
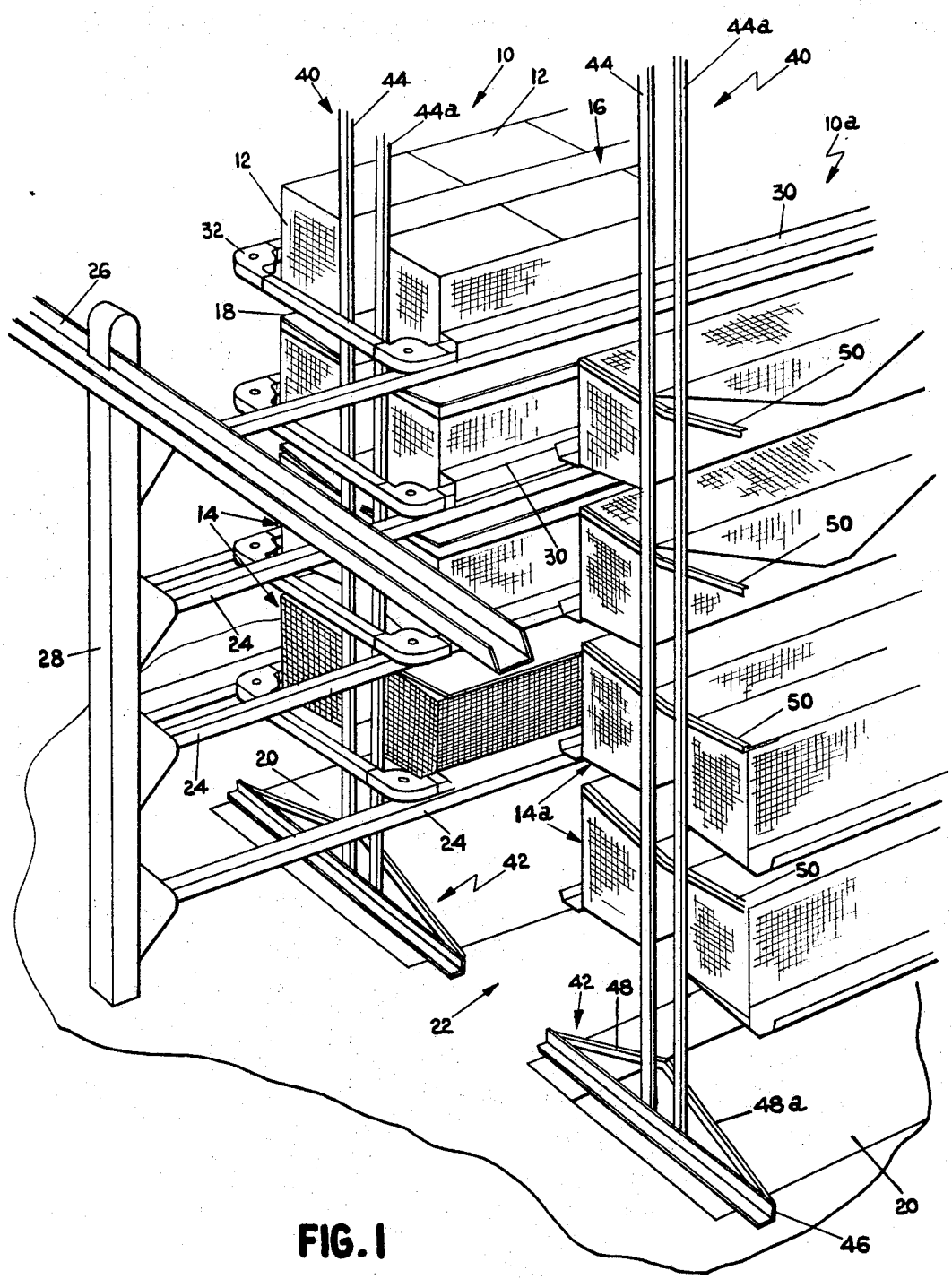
FIG. 1 is a fragmentary perspective view of two separate units of multi-tiered double row poultry cages mounted in accordance with the support apparatus of the invention.

Briefly, the drawings illustrate multiple batteries 10 and 10a (FIG. 1) of multi-deck poultry confinement cages 12. The cages are comprised of rectangular mesh components which typlify poultry confining enclosures of the general type found in conventional equipment. Each level of cages for each battery is arranged in two elongated cage rows 14 and 14a which are mounted in a back-to-back closely adjacent fashion with a space 16 maintained therebetween defining an opening through which droppings collected on elongated trays 18 can be pushed for depositing the droppings into a dung-collecting pit 20 positioned beneath each battery structure. Each battery is spaced from the other to define an aisle or passage 22 to permit visual examination and servicing of each row of cages by an attendant. Since each battery is identical to another, only one will be described for purposes of this disclosure.

Referring to battery 10 (shown in FIG. 1) the bottoms of each cage are inclined downwardly so that eggs laid within the cages will, under the influence of gravity, roll downwardly to the lowermost edge of the cage normally located at what is referred to as the front thereof. Openings are provided along this edge so that the eggs may pass out of the cages and onto a conveyor 24 which includes a conveyor belt (not shown). Since a plurality of vertically separated levels of cages are envisioned, the eggs collected on each conveyor 24 are raised by an elevator 28 for transfer to a central conveyor 26 which also includes a conveyor belt which then directs the eggs to a cnntral collection point. A preferred elevator arrangement is particularly described in U. S. Pat. No. 3,166,175 entitled: EGG COLLECTION AND TRANSVEYOR SYSTEM, filed Jan. 19, 1965 issued to Kurtz et al, and commonly assigned to the assignee of this application.

In addition to an automated egg-collecting system, an automated feeding and watering arrangement is also envisioned. Accordingly, arrangements which are well-known in the art can be provided such as feed troughs 30 positioned above the egg-collection trough and likewise including a conveyor 32 which automatically advances feed through the trough intermittently as desired. A watering system (not shown) can also be utilized, all of which is well-known and not described in detail herein.

Figure 2:
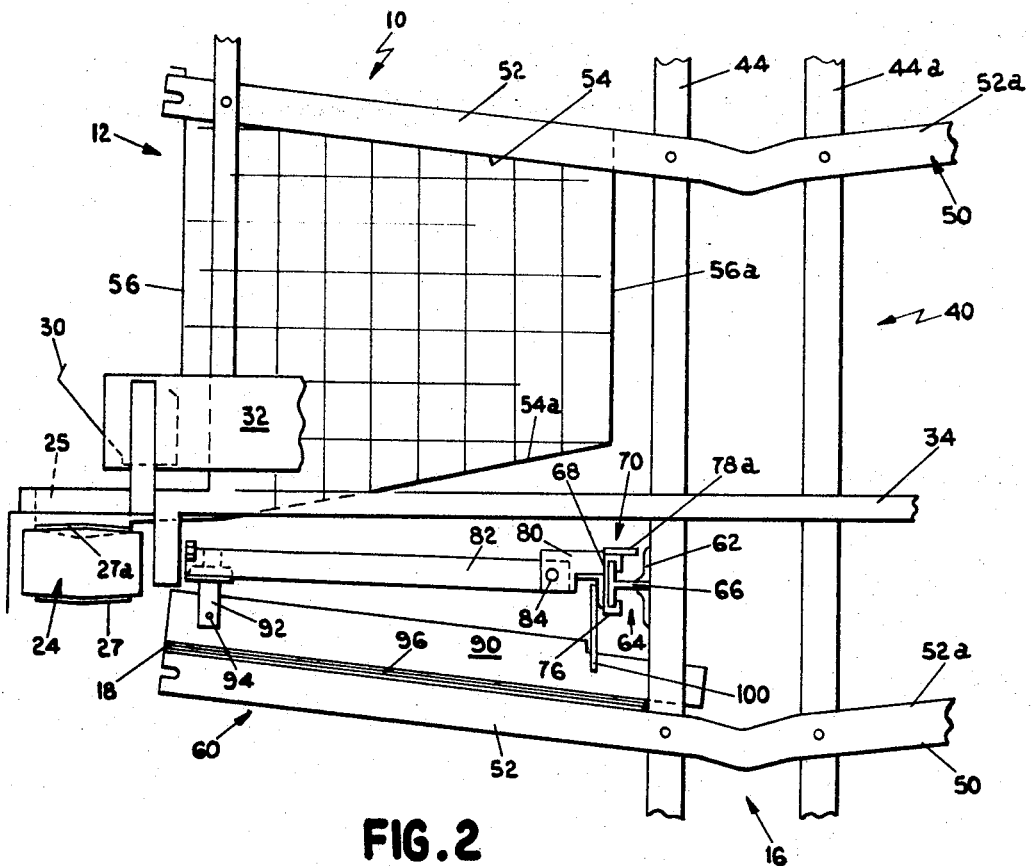
FIG. 2 is an enlarged, fragmentary elevation view showing additional details of the structure seen in FIG. 1 in addition to the scraping apparatus provided by the invention.

Referring to FIG. 2, an egg-receiving trough 25 is shown in phantom and is preferably an integral extension of the bottom of the cage. The receiver portion 27a of conveyor belt 27 is shown mounted for close passage along the bottom of trough 25 to advance eggs collected thereon to conveyor 24 and thence to elevator 28. The feed trough 30 is shown to be spaced slightly above egg-collecting trough 25. Both the feeding trough system and egg-collection conveyor system are shown mounted to a support frame 34 which extends laterally outward from a central upright support structure 40 which will be described in more detail hereinafter.

Referring now in greater detail to FIGS. 1 and 2, the primary support structure which permits the unique true vertical stacking will be described. This primary support structure is provided by a plurality of longitudinal spaced vertical upright support members 40 comprising a base 42 and vertical stringers 44 and 44a preferably formed of channel steel. Base 42 is also preferably formed of channel steel and includes a generally triangular configuration with floor member 46 and two inclined members 48 and 48a which are connected at one end to opposite ends of member 46 and inclined upwardly and connected at their upper ends to each other. Preferably, members 46, 48 and 48a are welded together. The triangular base structure is then connected to the pair of stringers 44 and 44a.

In FIG. 1, the dung-collecting pit is shown recessed beneath the floor 21. In this type of installation, the length of floor channel 46 is of sufficient size to fit across pit 20. It will be appreciated that it is not necessary to provide a recess pit in which case the entire floor channel 46 will be in contact with the floor surface.

Stringers 44 and 44a are adapted to rise vertically up through the center portion of each battery of cages. The stringers are spaced laterally from each other approximately the width of opening 16 between each row of oppositely facing cages for each level. In essence, each support structure 40 forms a pedestal type support for the multi-deck arrangement. For each layer of cages, a cross-support bar 50 is connected to stringers 44 and 44a by mechanical fasteners or welding. Preferably, the cross-support bars are attached to stringers 44 and 44a by mechanical fasteners since not all installations are intended to be permanent. This applies equally to the attachment of base 42 and in so doing provides a more economical and compact structure for purposes of shipping.

Referring to FIG. 2, each cross support 50 extends the full width of the structure and is characterized by a generally abbreviated V-shape whereby each cross bar has the inclined legs 52 and 52a rising from the center of stringers 44 and 44a. The primary reason for an incline support in accordance with the invention is that a dung-collecting board or tray 18 is connected to the top portion of each leg 52 and 52a. The slight incline assists the movement of the droppings toward the center of the structure for eventual deposit through spacing 16 between each row of cages for collection in pit 20.

Each cross support performs two functions. First, it provides the primary means for attaching drop trays 18 as explained above. Secondly, it is utilized to support by suspension each of the cages 12. One advantage in suspending a cage form a support structure instead of supporting it at its floor is that the floor of the cage construction is less rigid. While this might at first thought be considered undesirable, in reality the lack of rigidity in the cage floor tends to decrease egg breakage incurred as the eggs roll along the floor under the force of gravity toward the conveyor mechanism noted above. In other worfs, by suspensing the cages in accordance with this invention, the floor portion of the confinement cage is substantially free of rigid supporting elements located therebeneath so that there is an inherent flexibility in the cage floors. Ths support structure itself however in no way is less stronger than the more conventional type of structure referred to. This concept was first recognized in U. S. Pat. No. 3,552,359, filed Feb. 1, 1968, entitled ANIMAL CAGE SUSPENSION SYSTEM which patent was issued to Graze et al, and assigned to the assignee of this application.

As noted earlier, the conventional cage configuration utilizes a mesh-like floor which permits droppings to fall therethrough and in addition allows eggs laid thereon to roll by their gravitational weight out onto an egg-collection tray. This overall configuration is shown in FIG. 2 and it will be appreciated that the collection of droppings beneath each cage are urged toward the center of the structure while the eggs which are collected are urged toward the outside of the structure. Hence, the incline of dropping tray 18 is opposite to the incline of the bottom of cage 12.

In accordance with the invention, in order to suspend each cage from cross-support bars 50, the sides of each cage are characterized by a truncated pie-shape. That is, the upper and lower margins 54 and 54a of each cage are inclined inwardly toward the center of the structure. Consequently, the outer margin 56 is greater in length than the inner margin 56a. This configuration is desirable for an additional reason in that in a multiple-deck arrangement, a constant objective is to provide a cage having as low a profile as necessary so that the vertical spacing within the building can be utilized as efficiently as possible. The pie-shaped cross section of each cage permits a generally low cage profile while at the same time provides a portion of each cage wherein poultry confined therein can stand completely upright, which is an essentiql requisite for healthy poultry.

The particular details of suspending cages 12 from cross supports 50 are not described in detail since it is well within the skill of the art. It has been found however to be most economical to provide an integral cross-support bar 50 in lieu of two separate leg portions 52 and 52a. The incline or abbreviated V-shape is achieved by kinking or deforming the center of each bar resulting in the desired V-shape. The utilization of a pair of stringers 44 and 44a greatly enhances the stability of each structure since each cage row is suspended toward the outer end of each leg 52 and 52a. An additional reason for the utilization of two stringers is the particular mounting arrangement for the scraper assembly 60 utilized for cleaning off the drop trays 18 at intermittent periods. The details of the scraper assembly will now be described.

Figure 3:
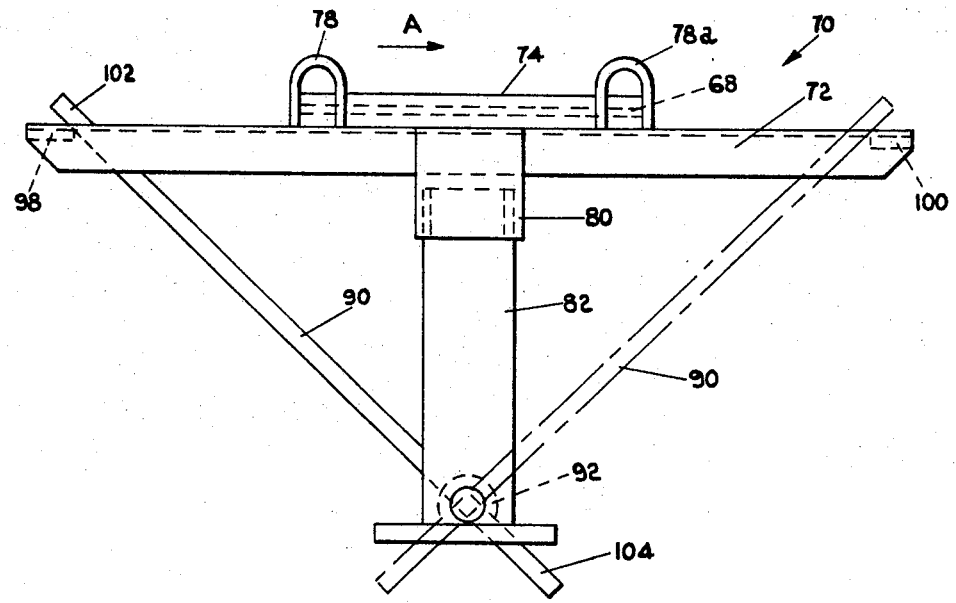
FIG. 3 is a plan view of the scraper apparatus provided by the invention.

In a pyramidal stacking or single layer cage construction, the droppings from the cages are generally exposed directly to a pit for collection thereon and subsequent removal from the building. However, in an arrangement such as that disclosed herein, true vertical stacking prevents a straight drop-type-arrangement since there are one or more levels of cages positioned directly beneath upper levels of cages. Hence, it is necessary to provide a device for collecting the droppings from each individual level of upper cages and remove the droppings from the collection device for deposit into a central collection pit. In accordance with the invention, a preferred apparatus is illustrated in FIGS. 2-5. Referring specifically to FIGS. 2 and 3, a scraper assembly is illustrated for removing the droppings from one longitudinally extending tray or board 18 adapted to collect the droppings beneath one row 10 of cages 12.

Spaced above cross-support leg 52 on stringer 44 is a bracket 62 (FIG. 2) which anchors a longitudinally extending rail 64 which extends the entire longitudinal length of row 10. As shown in FIG. 2, bracket 62 and rail 64 are mounted just beneath idler support frame 34. Rail 64 has a horizontal T-shape with the main leg 66 of T-rail being connected at its free end to bracket 62. This projects the top portion 68 of T-rail 64 away from stringer 44 to form a vertically standing rail portion 68 extending above and beneath the horizontal leg portion 66.

Figure 6:
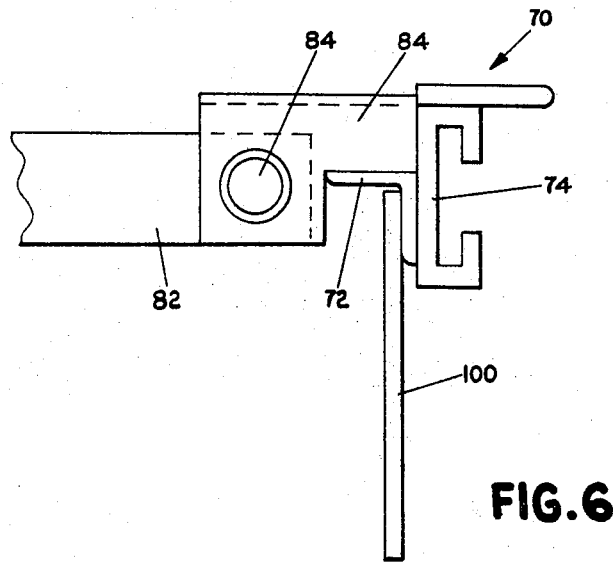
FIG. 6 is an enlarged fragmentary elevation view of the scraper mechanism.

A carriage 70 having a body portion 72 (FIGS. 3 and 6) and rail engaging portion 74 is mounted on rail 64 for longitudinal movement fore and aft along the rail. The rail engaging portion is comprised of a C-shape adapter 76 which fits over the lower edge of portion 68 of T-rail 64. In the fashion shown, it is fully supported by the rail and prevented from removal therefrom except at one end or the other of the rail. Thus, a tongue-and-slot type engagement is provided with the carriage interlocked to rail 64 and yet free to move longitudinally fore and aft along it. A pair of hooks 78 and 78a are welded on the top portion of portion 74 and are adapted for connection to a cable movable by a power source for advancing carriage 70 along rail 64. The particular details of the cable-pulley arrangement will be described hereinafter.

Figure 5:
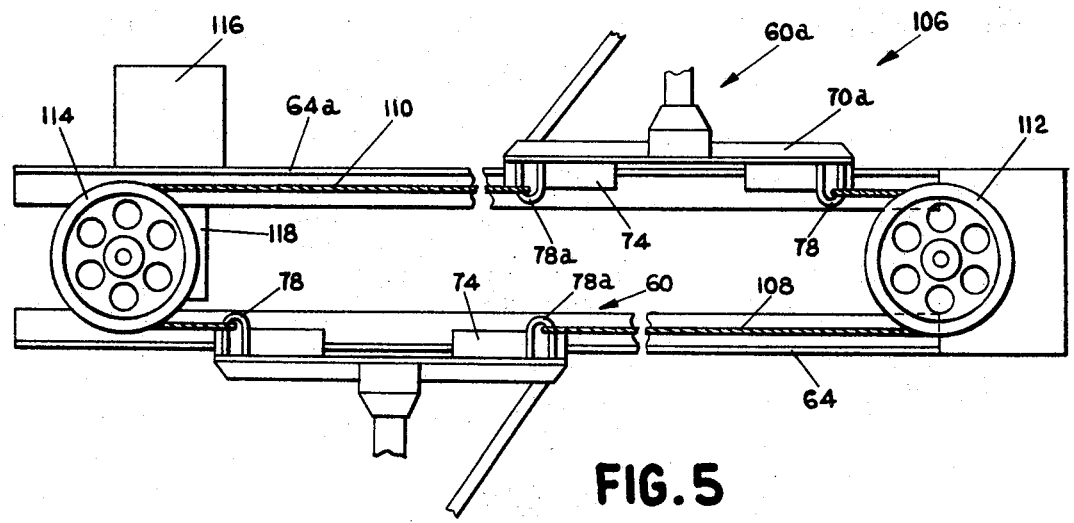
FIG. 5 is a fragmentary plan view of a cable-pulley arrangement for operating two scraper mechanisms simultaneously.

A mounting assembly, best shown in FIG. 5, comprises a housing 80 welded or fastened to body portion 72 and rail engaging portion 74 and extending laterally in the same direction as cross-support leg 52. The housing is adapted to hold a boom 82 which extends from housing 80 out over tray 18. The boom is pivotally mounted to housing 80 by a pin 84 which permits the boom to pivot downwardly and upwardly about a horizontal axis relative to housing 80 toward or away from dropping tray 18. A scraper 90 is suspended from boom 82 for scraping engagement with tray 18. Scraper 90 is attached to boom 82 near its outer end adjacent the free end of boom 82 by a clevis 92 which is connected to boom 82 for pivotal rotation about a vertical axis. This permits scraper 90 to rotate about a vertical axis relative to boom 82. The connection of scraper 90 to clevis 92 is also pivotal about a pin 94 to permit rotation about a horizontal axis relative to boom 82. This permits scraper 90 to rise and fall in accordance with any irregularities in tray 18 as it performs a scraping function. At the same time the weight of scraper 90 causes it to seek scraping engagement with tray 18. The pivotal rotation of boom 82 about pin 84 permits the boom and scraper to seek a positive scraping engagement with tray 18 at all times while at the same time permitting the boom and scraper to rise and fall over uneven portions of the tray. It will be appreciated that in between intermittent operations of the scraper assembly 60, droppings on tray 18 may harden. The scraping action of the blade will continually erode these hardenings, however, some relief must be provided in order to permit the scraper and boom to adjust as it is dragged over these hardened droppings. At the same time the three separate pivotal adjustments provided by pin 84, clevis 92 and pin 94 permits the scraper assembly to be mounted securely to stringer 44 without requiring any critical fabrication steps since the boom and scraper are free to rotate about a horizontal axis to seek positive engagement between the scraping edge 96 of scraper 90 and tray 18.

Body portion 72 as shown in FIGS. 2-5 is comprised of an angle shaped channel element and extends substantially beyond the extremity of rail engaging portion 74. At each end of body portion 72 a depending stop 98 and 100 is provided which limits the angular rotation of scraper blade 90 about a vertical axis. For example, if carriage 70 is being pulled in the direction of arrow A shown in FIG. 3, the frictional scraping of scraper blade 90 along tray 18 will cause blade 90 to rotate from right to left until its free end 102 comes into contact with stop 98. At this point, further rotation is prevented even though carriage 70 continues to move from left to right. However, a plow effect is provided since the outer end 104 of scraper blade 90 is positioned substantially ahead of the trailing or free end 102 so that a plowing type motion is provided which directs the scrapings on tray 18 to travel toward the free or inner end 102. Once the droppings scraped by blade 90 reach the inner end or the inner margin of tray 18, they will be deposited through opening 16 and fall by their gravitational weight to pit 20 shown in FIG. 1.

Figure 4:
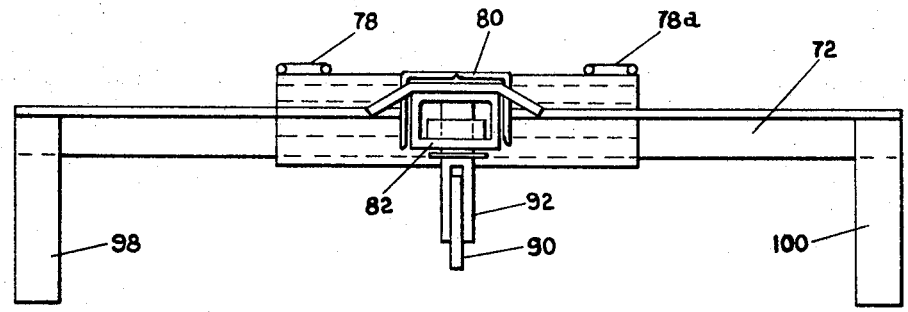
FIG. 4 is a side elevation view of the scraper apparatus shown in FIG. 3.

One of the unique concepts provided by the invention is the scraping effect of blade 90 regardless of the direction of movement of carriage 70. That is if carriage 70 is moved in the direction opposite to that of arrow As shown in FIG. 3, scraper blade 90 by its frictional engagement with the droppings on tray 54 will rotate in a clockwise direction until free end 102 comes into abutment with stop 100 as shown in phantom in FIG. 3. With the carriage moving from right to left, the scrapings scraped by blade 90 will again be urged toward the free end 102 for deposit off the inner margin of tray 18 through opening 16 onto the surface of pit 20. FIG. 4 illustrates the blade in a position perpendicular to the direction of travel and it will be appreciated that stops 98 and 100 define the limits of angular rotation of blade 90.

Referring now to FIG. 5, a drive mechanism 106 is shown which produces simultaneous scraping action by a pair of scraping mechanisms 60 and 60a each located over an array of cages on each side of vertical stringers 44 and 44a (FIG. 3) and horizontal rails 64 and 64a (FIG. 5) so that one entire level of dropping trays is cleaned at the same time. That is, with reference to FIG. 2, when scraper assembly 60 is actuated to clean tray 18, on the left side of stringer 44 a similar scraping mechanism is utilized on the right side of stringer 44a to clean the trays on that side. The drive mechanism 106 includes a pair of cables 108 and 110. Cable 108 is attached at one end to hook 78a and wound through an idler cable drum 112 for connection at its opposite end to hook 78 of scraper assembly 60a. The second cable 110 is connected at one end to hook 78 of scraper assembly 60 and wound through a cable driving drum 114 for connection at its opposite end to hook 78a of scraper assembly 60a. Drive pulley 114 is movable in either a clockwise or counter-clockwise direction by a conventional power source such as illustrated by motor 116 and gear box 118. Rotation of drum 114 in a clockwise direction produces a pull on cable 110 causing movement of scraper assembly 60 from right to left. This movement likewise provides movement of scraper assembly 68 through a pull-on cable 108 in a left to right direction opposite to that of scraper assembly 60. In this direction of movement, blade 90 will be in a position as shown in phantom in FIG. 3 with movement of scraper assembly 60 being right to left to scrape the droppings into the outer opening 16. Blade 90a will, of course, be in the opposite position since scraper assembly 60a (FIG. 5) will be moving from left to right.

Rotation of drive drum 114 in a counter-clockwise direction results in movement of scraper assembly 60 in a left to right direction while scraper assembly 60a moves in a right to left direction. Consequently, blade 90 will be positioned as shown in solid lines in FIG. 3 while blade 90a will be oppositely inclined.

Generally, one complete fore and aft sweep is made each day although intermittent operations of shorter frequency can easily be initiated. Motor 116 can be operated in accordance with a timer so that an arbitrary number of cleaning passes are made each day. Appropriate sensing and tripping mechanisms (not shown) are positionable at each end of each particular level causing reversal of the direction of motor 116 when the scraper has reached the completion of each scraping path. A trip mechanism at the other end can be utilized to turn motor 116 off.

A more thorough cleaning operation is achieved by the utilization of a scraper mechanism which provides scraping engagement with trays 18 regardless of the direction of movement.

In view of the foregoing, an extremely simple yet positive support structure is provided which permits vertical stacking of multi-layers of poultry cages. By mounting both the cages and trays on the single cross-support bar, a lower profile structure is obtained which thereby permits a more efficient utilization of space. The unique scraper mechanism provided permits a true vertical stacking in addition to providing a more efficient scraper means.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particuar details of construction shown, except as specifically stated in the claims.

I claim:

1. In a multi-deck poultry cage assembly having at least two vertically spaced decks of cages each of said decks having a pair of oppositely facing spaced row of cages extending longitudinally side-by-side, said cages having mesh bottoms to permit droppings and the like to fall therethrough, each of said lower rows of cages having a waste collecting tray positioned thereabove to protect poultry confined therein from droppings from above, means for automatically scraping the droppings collected on said trays into said spacing between said rows; and support means for supporting said cages, trays and scraper means above a waste-collecting surface; the improvement comprising; said scraper means having a rail extending the longitudinal length of said trays; a carriage slidably mounted on said rail; means for moving said carriage in a fore and aft direction along said rail; and a scraper blade operatively associated with said carriage and extending transversely of said carriage over said trays, said scraper being movable pivotally relative said carriage about a generally horizontal and vertical axis, said movement pivotally about a horizontal axis permitting said blade freedom of movement to scrape over uneven obstructions while at the same time beingurged by its gravitational being urged to be positioned against said trays for scraping engagement, the drag produced by sliding said blade over said tray surface causing the blade to swing about said vertical axis so that one of said ends of said blade will be advanced in the direction of travel ahead of the other end to cause the droppings being scraped thereby to be deposited off the same side of said tray regardless of the direction of movement of said carriage.

2. The multi-deck poultry cage assembly according to claim 1 wherein said scraper blade is operatively associated with said carriage by a support arm connected at one end to said carriage and extending transversely from said carriage over said tray, said arm being pivotally connected to said carriage for movement in a generally vertical plane about a horizontal axis, said scraper blade being pivotally connected to the other end of said support arm for pivotal movement about a vertical and horizontal axis, the gravitational weight of said scraper blade and support arm urging the lower edge of said scraper blade into constant engagement with said tray.

3. The multi-deck poultry cage assembly according to claim 2 wherein said guide rail extends along the inner margin of said trays along the periphery of said spacing, and said carriage including stop means depending from the longitudinal extremities of said carriage, said scraper blade being swingable about a vertical axis intermediate said stop means so that the end of said scraper blade connected to said support arm is movable ahead of the opposite end of said scraper blade with respect to the direction of travel at a preselected angle.

4. The multi-deck poultry cage assembly according to claim 1 wherein said support means includes at least a pair of longitudinally spaced support structures each of which includes a base stand, a pair of upstanding support stringers connected to said base stand, and one or more cross supports connected to each of said stringers, each of said cross supports including a pair of legs forming a general V-shape, the incline of each leg being preselected to equal the incline of said drop trays, said drop trays being mounted on top of said legs.

5. The multi-deck poultry cage assembly according to claim 4 wherein said cage bottoms are inclined in a direction opposite that of said waste collecting tray positioned therebeneath to permit eggs laid thereon to roll by their gravitational weight to the outer margin for collection; said cages having sides the bottom margin of which is inclined in accordance with the incline of said cage bottoms and the upper margin being inclined in a direction opposite that of the lower margin in accordance with the incline of the leg of said cross-support channel, said cages being suspended from and supported by said cross-support channels.

6. The multi-deck poultry cage assembly according to claim 4 wherein said cross-support channels are formed from an integral channel member, the general V-shape being provided by deforming the center portion of said cross support to shape said cross support.

7. Apparatus for supporting a plurality of elevated confinement cages for poultry comprising: a first row of multi-tiered cages arranged in vertically spaced, longitudinally extending side-by-side alignment; a second row of cages arranged similar to said first row, each of said cages including a mesh bottom to allow droppings to fall therethrough; a drop tray positioned above said cages for collecting said droppings to prevent their entry into the cages disposed therebeneath, said tray being inclined downwardly to the horizontal in a direction toward the opposite row of cages; support means for supporting said first and second rows in back-to-back spaced relationship so that said drop trays converge inwardly toward each other; and means for scraping said droppings from said tray into said spacing for deposit into a pit positioned beneath said apparatus, said support means having at least a pair of support structures each of said support structures comprising a base stand, a pair of upstanding support members connected to said stand, and one or more one-piece cross supports connected to each of said uprights, each of said cross supports including a pair of arms forming a general V-shape, the incline of each arm being preselected to equal the incline of said drop trays, said drop trays being affixed to said arms.

8. The apparatus according to claim 7 wherein said pair of upright support members are spaced from each other a distance equal to said spacing of said first and second rows, said scraping means including a pair of guide rails extending longitudinally the length of said rows, said rails being connected to each of said support structures and positioned above each of said V-shaped cross supports, a carriage movable on each of said rails the length of said rows, a support arm mounted at one end to said carriage and extending transversely to said guide rails over said drop trays, and a scraper blade pivotally connected to the opposite end of said support arm, said scraper engaging said drop tray, and means for moving said carriage along said guide rail to scrape said droppings into said pit.

9. The apparatus according to claim 8 wherein said support arm is pivotally mounted to said carriage to permit free rotation of said arm and scraper blade about a generally horizontal axis, said scraper blade being pivotally mounted to said support arm for rotation about a generally vertical and horizontal axis, said movement about a vertical axis causing the blade to swing about said vertical axis so that one of the ends of said blade will be advanced in the direction of travel ahead of the other end to cause the droppings scraped thereby to be deposited off the same side of said tray regardless of the direction of movement of said carriage.

10. In a self-reversing manure scraper for scraping droppings collected on a tray beneath a row of poultry cages into a manure pit, the improvement comprising: a guide rail extending the longitudinal length of said tray; a carriage slidably mounted on said guide rail; means for moving said carriage in a fore and aft direction along said rail; a support arm connected at one end to said carriage and extending transversely to said guide rail over said tray, said arm being pivotally mounted to said carriage for movement about a generally horizontal axis, the gravitational weight of said support arm urging said arm toward sadi tray; a scraper blade connected to the other end of said support arm, the gravitational weight of said scraper blade and support arm urging the lower edge of said scraper blade into engagement with said tray, said scraper blade being connected to said support arm for pivotal movement about a generally vertical axis so that regardless of the direction of movement of said carriage and support arm, the drag produced by sliding said blade over said tray surface causes the blade to swing about said vertical axis so that one of said ends of said blades will be advanced in the direction of travel ahead of the other end to cause the droppings being scraped thereby to be deposited off the same side of said tray, the overall length of said blade being sufficient to extend over the width of said tray.

11. The manure scraper according to claim 10 wherein said suppoort arm extends beyond the mid point of said scraper blade, said other of said ends of said scraper blade extending beneath said carriage and guide rail, and stop means on each end of said carriage preventing the pivotal movement of said blade about a vertical axis within defined limits so that regardless of the direction of movement of said carriage, said blade is swung for scraping movement over said tray at a preselected scraping angle.

12. The manure scraper according to claim 11 wherein the manure scraper is inclined at an angle with respect to the horizontal so that said droppings being scraped by said blade are urged in a downward movement, said support blade being connected to said support arm for pivotal movement about a horizontal axis so that said blade is free to assume the overall slope of said tray.

13. The manure scraper according to claim 10 wherein said means for moving said carriage includes a drive and idler wheel means mounted at each end of said guide rail, and a cable wrapped around each end of said wheel and connected at each end to each end of said carriage for selectively moving said carriage along said guide rail in a fore and aft direction.

14. The manure scraper according to claim 13 wherein said poultry cage arrangement includes a first and second row of spaced cages interconnected and supported by a support means, said cable being connected to a carriage from each of said rows on each side of said drive wheel means so that when one carriage is positioned at one end of said rows, said other carriage is positioned at the opposite end of said rows so that when one of said carriages is pulled in one direction, the other of said carriages is pulled in the other direction to deposit said droppings from said trays inwardly into said spacing.

15. Apparatus for supporting a plurality of elevated confinement cages for poultry comprising: a first row of multi-tiered cages arranged in vertically spaced, longitudinally extending side-by-side alignment; a second row of cages arranged similar to said first row, each of said cages including a mesh bottom to allow droppings to fall therethrough; a drop tray positioned above said cages for collecting said droppings to prevent their entry into the cages disposed therebeneath, said tray being inclined downwardly to the horizontal in a direction toward the opposite row of cages; support means for supporting said first and second rows in back-to-back spaced relationship so that said drop trays converge inwardly toward each other; and means for scraping said droppings from said tray into said spacing for deposit into a pit positioned beneath said apparatus, said support means including a pair of upright support members spaced from each other a distance equal to said spacing of said first and second rows, said scraping means including: a guide rail extending longitudinally the length of each row: a carriage movable on each of said rails the length of said rows; blade means connected to said carriage and extending transversely to said guide rails over said drop trays, said blade means being pivotally connected to said carriage and engaging said drop tray; and means for moving said carriage along said guide rail to scrape said droppings into said pit.

16. Apparatus according to claim 15 wherein said blade means includes a support arm and scraper blade, said support arm being connected to said carriage and said scraper blade being connected to said support arm, at least one of said scraper blade and support arm being pivotally connected to each other or said carriage to permit said pivotal movement relative to said carriage.

17. Apparatus according to claim 16 wherein said support arm is pivotally mounted to said carriage to permit free rotation of said arm and scraper blade about a generally horizontal axis, said scraper blade being pivotally mounted to said support arm for rotation about a generally vertical and horizontal axis, said movement about a vertical axis causing the blade to swing about said vertical axis so that one of the ends of said blade will be advanced in the direction of travel ahead of the other end to cause the droppings scraped thereby to be deposited off the same side of said tray regardless of the direction of movement of said carriage.

18. Apparatus for supporting a plurality of elevated confinement cages for poultry comprising: a first row of multi-tiered cages arranged in vertically spaced, longitudinally extending side-by-side alignment; a second row of cages arranged similar to said first row, each of said cages including a mesh bottom to alllow droppings to fall therethrough; a drop tray positioned above said cages for collecting said droppings to prevent their entry into the cages disposed therebeneath, said tray being inclined downwardly to the horizontal in a direction toward the opposite row of cages; support means for supporting said first and second rows in back-to-back spaced relationship so that said drop trays converge inwardly toward each other; and means for scraping said droppings from said tray into said spacing for deposit into a pit positioned beneath said apparatus, said scraping means including guide rail means on said support means, scraper blade means movable along said guide rail means for scraping engagement with said trays, and means for driving said scraper blade means endlessly back and forth along said guide rail means, said scraper blade means providing scraping engagement regardless of the direction of movement.

* * * * *

PO-1050
(5/69)

UNITED STATES PATENT OFFICE
CERTIFICATE OF CORRECTION

Patent No. 3,768,444   Dated October 30, 1973

Inventor(s) Robert L. Van Huis

It is certified that error appears in the above-identified patent and that said Letters Patent are hereby corrected as shown below:

Column 1, lines 28 & 29; "increasinly" should be ---increasingly---.

Column 4, line 17; "form" should be --- from ---;
        line 24; "worfs" should be --- words---;
        line 24; "suspensing" should be --- suspending---;

line 61; "essentiql" should be --- essential ---.

Column 6, line 56; "As" should be ---A---.

Column 8, line 31; "beingurged" should be --- being urged ---
        lines 31 & 32: "being urged" should be ---weight---

Column 10, line 21; "sadi" should be --- said ---

Signed and sealed this 17th day of September 1974.

(SEAL)
Attest:

McCOY M. GIBSON JR.
Attesting Officer

C. MARSHALL DANN
Commissioner of Patents